United States Patent
Iampen

Patent Number: 6,044,968
Date of Patent: Apr. 4, 2000

[54] TIRE COVER

[76] Inventor: Marcel H. Iampen, R.R. #1, S-13B, C21, Peachland, British Columbia, Canada, V0ll 1X0

[21] Appl. No.: 09/263,257

[22] Filed: Mar. 5, 1999

Related U.S. Application Data

[63] Continuation-in-part of application No. 08/852,381, May 7, 1997, abandoned
[60] Provisional application No. 06/033,347, Nov. 29, 1996.

[30] Foreign Application Priority Data

May 14, 1996 [CA] Canada ................................. 2170652

[51] Int. Cl.[7] .............................. B65D 85/06; B60B 7/02; B05C 11/11
[52] U.S. Cl. ..................... 206/304; 301/37.1; 301/37.31; 118/505
[58] Field of Search ................................ 206/304, 304.1, 206/304.2, 303; D12/202, 213; 224/42.13, 42.14, 42.2, 42.21, 42.24; 118/505; 301/37.1, 37.22, 37.31, 37.42

[56] References Cited

U.S. PATENT DOCUMENTS

| | | |
|---|---|---|
| D. 182,802 | 5/1958 | Gillan . |
| D. 217,412 | 4/1970 | Moquin . |
| D. 377,332 | 1/1997 | Cruz, III . |
| D. 379,171 | 5/1997 | Hope et al. . |
| D. 390,181 | 2/1998 | Morrison . |
| D. 391,912 | 3/1998 | Nikolaevich . |
| 962,401 | 6/1910 | Dow .................. 224/42.2 X |
| 1,456,962 | 5/1923 | Baker ................ 224/42.2 X |
| 1,943,922 | 1/1934 | Lyon . |
| 1,965,527 | 7/1934 | Lyon . |
| 1,965,532 | 7/1934 | Lyon . |
| 2,042,949 | 6/1936 | Lyon . |
| 2,073,845 | 3/1937 | Lyon . |
| 2,089,497 | 8/1937 | Lyon . |
| 2,102,468 | 12/1937 | Lyon . |
| 2,107,015 | 2/1938 | Short . |
| 2,440,805 | 5/1948 | Lyon . |
| 2,730,156 | 1/1956 | Ansel . |
| 2,849,045 | 8/1958 | Anderson . |
| 3,770,035 | 11/1973 | Haye . |
| 3,893,497 | 7/1975 | Vaglas . |
| 4,121,638 | 10/1978 | Phillips . |
| 4,190,939 | 3/1980 | Keller . |
| 4,214,683 | 7/1980 | Wills . |
| 4,955,670 | 9/1990 | Koller ................. 301/37.31 |
| 4,993,609 | 2/1991 | Flint . |
| 5,027,990 | 7/1991 | Sonnenberg . |
| 5,039,172 | 8/1991 | Kreiger ................ 301/37.1 |
| 5,524,972 | 6/1996 | Cailor et al. . |
| 5,799,845 | 9/1998 | Matsushita ........... 274/42.14 |

FOREIGN PATENT DOCUMENTS

| | | | |
|---|---|---|---|
| 0692508 | 11/1930 | France ................. 206/304 |
| 0357213 | 6/1930 | United Kingdom ...... 206/304 |

*Primary Examiner*—Bryon P. Gehman
*Attorney, Agent, or Firm*—Antony C. Edwards

[57] ABSTRACT

A tire protective cover for covering and protecting a static mounted tire from environmental hazards, wherein the environmental hazards include ultra-violet radiation and airborne contaminants such, corrosive fluids or paint protection from dogs urinating on rims and tires. The tire cover includes a resilient casing for covering both one side of a tire, wherein the resilient casing covering the one side of the tire has a generally circular member having a radially adjacent series of sequentially raised concentric annular surfaces. Lugs are provided for gripping, and structurally reinforcing, the concentrically inner, center portion of the cover.

9 Claims, 4 Drawing Sheets

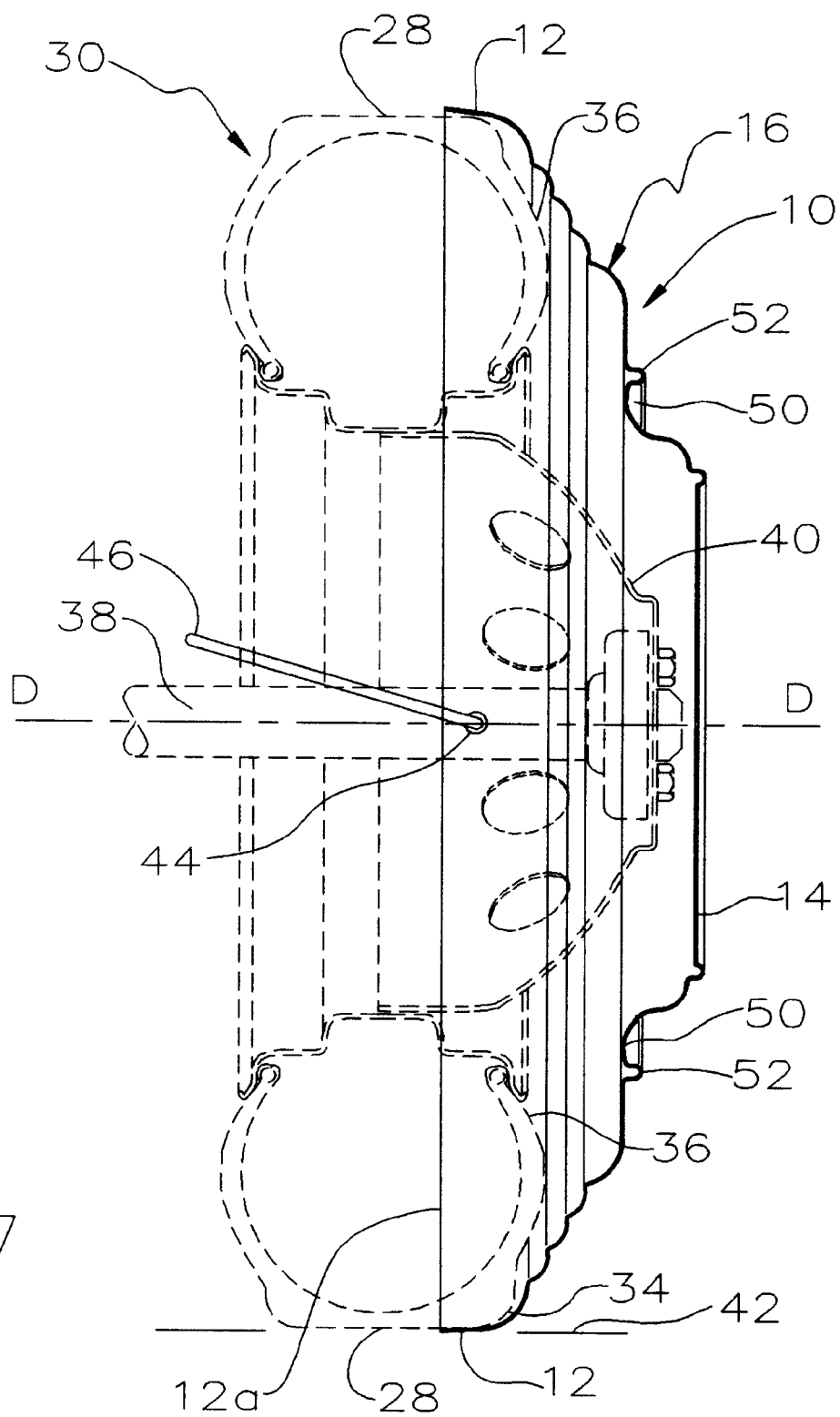

TIRE COVER

CROSS REFERENCE TO RELATED APPLICATION

This application is a continuation-in-part from U.S. patent application Ser. No. 08/852,381 filed May 7, 1997, now abandoned, titled Tire Protector which claimed domestic priority from U.S. Provisional patent application Ser. No. 60/033,347 filed Nov. 29, 1996 titled Tire Protector.

FIELD OF THE INVENTION

This invention relates to the field of covers for mounting on tires, and in particular, to flexible covers for mounting over exposed outer sidewalls of a tire when the tire is in a static position, for example, when a vehicle is parked and the tire is supporting the vehicle.

BACKGROUND OF THE INVENTION

There exists many situations in which it would be advantageous to install a flexible tire protective cover over a static tire and to provide for quick removal and convenient stacking storage and transport of the tire protective covers when not in use. One such example is in the case of recreational vehicles, trailers or the like where the recreational vehicle or trailer may be parked in a static position for extended periods of time in sunny climates where ozone aid the ultraviolet ("UV") radiation of the sunlight will deteriorate the rubber compound of the exposed surfaces of the tire, and in particular, the exposed relatively thin sidewalls of the exposed tire.

It is thus advantageous to both protect exposed surfaces of a tire from environmental hazards including ozone ultraviolet radiation and airborne contaminants such as corrosive fluids or paint and to protect from dogs urinating on alloy wheels and tires, in that urine is corrosive. It is also convenient to stack such tire protective covers for storage and transport when not in use.

UV damage is a recognized problem for rubber compound tires. Typically, this is the reason that rubber compound tires are black and incorporate a UV stabilizer called an absorber. Absorbers operate by capturing and absorbing harmful UV radiation energy instead of having that energy absorbed by the tire polymer molecules. The energy absorbed by the absorbers is converted into heat so as to dissipate harmlessly from the tire. Conventionally, tire manufacturers use a carbon black absorber Thus, rubber compound tires are black. Absorbers such as carbon black absorbers are depleted over tine so that the protection they afford tires from UV damage gradually diminishes. Thus, as may be commonly observed, rubber compound tires having carbon black absorbers eventually turn grey over time and exposure to UV radiation.

Conventional rubber compound tires are also protected against ozone damage. Typically, tire manufacturers use waxes to protect against ozone. In operation, conventional rubber compound tires incorporating such waxes flex during normal usage and such flexing causes the waxes to migrate to die surface of the tire where the waxes form a physical barrier between the air, the ozone carrier medium, and the tire polymer. The process of migrating the waxes to the surface of the tire is called blooming. When tires are not in use, so that they are not flexed, for example, when a vehicle is parked, blooming does not occur and thus the ozone will eventually penetrate the protective wax on the surface of the tire sand degrade the tire polymers. The combination of degradation by the effect of ozone and UV radiation over extended periods of time causes the tire to dry and eventually crack.

Petrochemicals and silicone oils can remove the protective waxes and increase the rate of degradation. Common automotive "protectants" and "tire dressings" are typically devoid of UV stabilizers of any type and contain petrochemicals and/or silicone oils which dissolve away the protective waxes and can actually aggress the sidewall deterioration. In the event of warranty sidewall failure, one of the first things tire manufacturers look for is evidence of the use of these types of products. When found, this is often cause for not warranting the sidewall failure.

The tread surface of tires are conventionally manufactured with more plys than the sidewall of tires. The tread of a tire also has a steel belt molded into the circumference of it to afford more protection for the tread. In most cases the tread of a tire is predominantly situated under a body, fender, wheel well, etc. and so is not as exposed and therefore does not deteriorate as rapidly as the sidewall. The sidewall, being a weaker construction, requires a protective covering to shield it from the suns ultraviolet rays.

In the prior art, applicant is aware of U.S. Pat. No. 5,027,990 which teaches a retractable blind, mountable in a wheel well for retractably covering a tire to shield the tire from ultraviolet rays. This device suffers from the drawback of being complex and, thus, prone to malfunction due to incursion of moisture and dirt such as would normally be found within a wheel well.

SUMMARY OF THE INVENTION

In summary, the present invention is a tire protective cover for covering and protecting a static mounted tire from environmental hazards, wherein the environmental hazards include ultra-violet radiation and air-borne contaminants such as corrosive fluids or paint. The tire cover includes a resilient casing for covering both one side of a tire, wherein the resilient casing covering the one side of the tire has a generally circular member having a radially adjacent series of sequentially raised concentric annular surfaces. Lugs are provided for gripping, and structurally reinforcing, the concentrically inner, center portion of the cover.

In particular, the tire cover of the present invention includes a flexible truncated cone having a base rim around a periphery thereof, a truncated top surface, and a generally conical surface extending from the base rim to the top surface. The generally conical surface has a radially adjacent array of concentric rings formed thereon as a concentrically stepped surface on the generally conical surface. A plurality of the rings correspond in diameter to a corresponding range of tire sizes to which it is desired to mount the tire cover. The base rim has a notch therein sized to accommodate a bulge in a sidewall of a static tire, under weight loading, resting on a ground surface thereunder. The truncated top surface is spaced from the base rim a sufficient distance so as to accommodate within the tire cover a hub protruding from the tire when the tire cover is mounted over the sidewall.

In the preferred embodiment, the radially adjacent array of concentric rings are formed in the generally conical surface around a radially outer portion of the conical surface. A radially spaced apart array of lugs are formed on a radially inner portion of the conical surface, adjacent the truncated top surface so as to protrude therefrom so as to provide buttressing support and large hand-holds for grasping.

An elongate resilient fastening means, such as a bungee or other resilient strap, is provided for mounting the tire cover to the tire.

BRIEF DESCRIPTION OF THE DRAWINGS

FIG. 6 is the cross section view of FIG. 5 showing the tire cover of the said embodiment as it would be seen mounted onto a tire and wheel hub.

DETAILED DESCRIPTION OF THE PREFERRED EMBODIMENT

Figure 1:
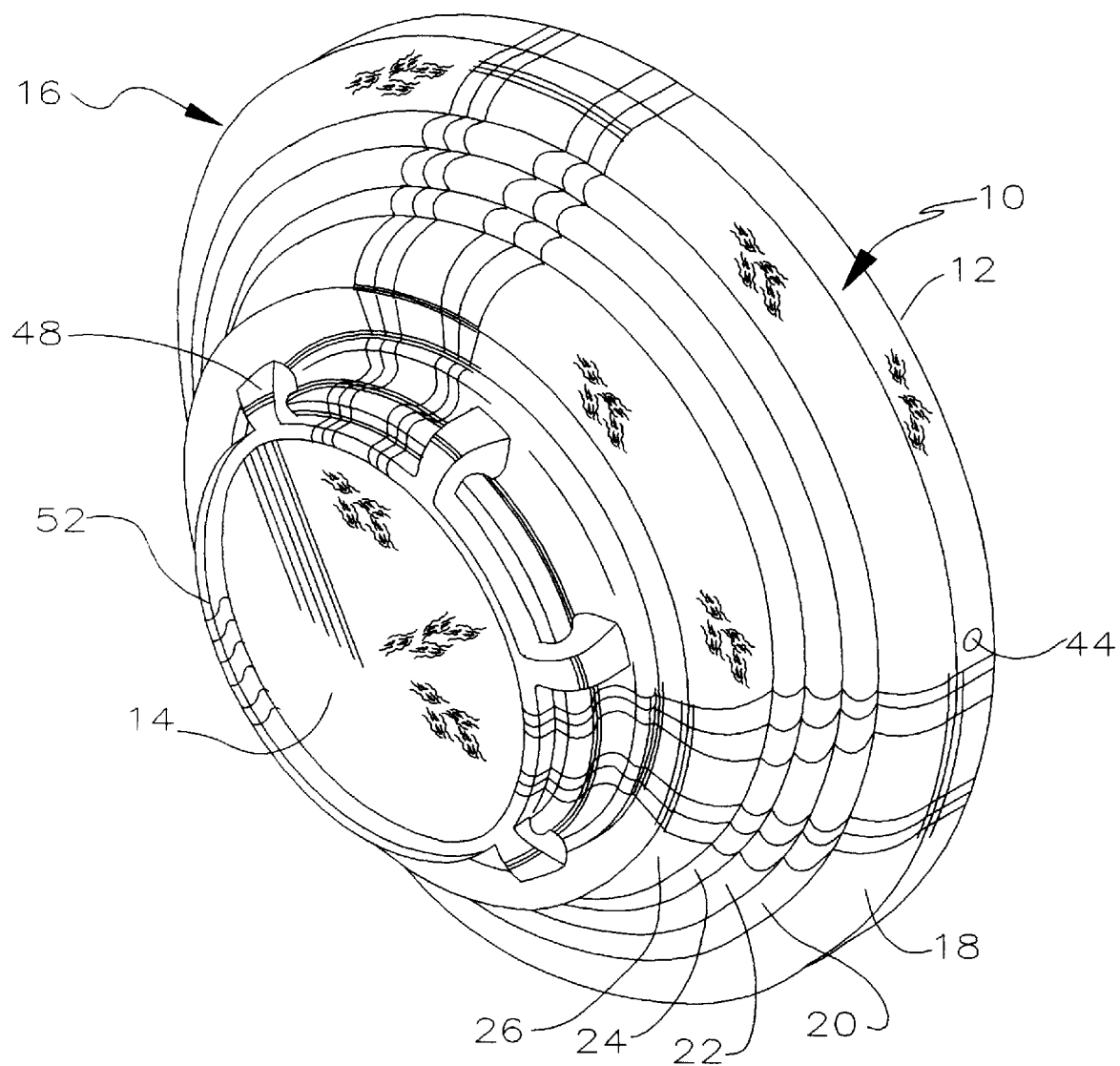
FIG. 1 is a right side perspective view of an embodiment of the Tire Cover.

The tire cover of the present invention is advantageously a ⅛" thick, polyethylene disc having the shape of a truncated flattened cone The cover is simple to install over all types of tires on rims for RV's, motorhomes, trailers, farm implements, etc., when the tires are in contact with the ground, without having to move the wheel vertically or horizontally. The tire cover fits between the side body and a wheel of a vehicle, RV, trailers, etc., without having to alter or cut a portion out of the cover. The tire cover installs over protruding hubcaps on RV's, motorhomes, trailers, etc., without having to remove the hubcaps. The tire cover also installs over protruding reversed front wheel truck rims, without cutting or adapting of the cover.

The tire cover provides a one-size-may-be-fitted-to-all cover configured to cover the outward facing tire surface on tires of automobiles, motorhomes, trucks, RVs, airplanes and trailers in static use. The shell-like cover may be maintained in place by a bungee cord stretched across the opening diameter of tie cover, and secured behind the tire over or under the corresponding axle to maintain the cower in place. The cover extends over the entire circumference of the tire sidewall thus protecting the tire sidewall from environmental elements including solar UV radiation.

A cut out portion at the bottom of the tire cover allows for static tire bulge adjacent the ground and allows for installation over a tire without moving the tire either vertically or horizontally from its supportive position in contact with the ground. The cover is somewhat pliable, therefore able to flex without breaking in the event that the tire loses air and becomes flat, or an operator forgets to remove the cover and then moves the vehicle or trailer.

The cover may advantageously be manufactured by an injection molding process whereby one mold can manufacture 6 different wheel size covers by placing a corresponding number of inserts into the mold to reduce the effective mold cavity size down to the desired cover size. One mold may thus produce a cover corresponding to a large size truck tire down through a range of smaller commercially available tires. All sizes of tire covers will compactly stack inside each other for, travel, storage, and shipping, including tire covers for large truck tires.

Conventional truck tire sizes range from large truck tires such as 22.85 inch tires down to 14 inch tires. In particular, commonly available tire sizes are 14 inch, 15 inch, 16 inch, 19.5 inch, and 22.85 inch. For the reason set out above, it is advantageous to provide a tire cover to protect the sidewalls of all these various sizes of tires. However, for a proper fit, a tire cover is advantageously appropriately fitted for the particular tire size. For example in the tire cover of the present invention, it has been found that a quarter inch spacing between the perimeter of the tire cover and the tire provides proper fitment. Consequently, for a 14 inch tire, a tire cover according to the present invention has a diameter of 27¼ inches. For a 15 inch tire, the tire cover of the present invention has a diameter of 28⅞ inches. For a 16 inch tire a tire cover of the present invention has a diameter of 31½ inches. For a 19.5 inch tire a tire cover of the present invention has a 33¾ inch diameter. For a 22.85 inch tire, a tire cover of the present invention has a 37 inch diameter.

In its largest diameter size, the tire cover of the present invention has a depth of 6½ inches at the center so as to accommodate the protrusion encountered with reversed front wheel truck rims. Thus it has been found that an injection molding process is advantageous in that the mold is 6½ inches in depth, that is, sized to produce the largest diameter tire cover of the present invention, and that such a mold may also be used to produce the smaller diameter sizes by insertion into the mold of a corresponding number of downsizing inserts. Producing the tire covers of the present invention in their various sizes in this fashion avoids the additional manufacturing expense of separate molds for each size of tire cover or if one single large size of tire cover is produced, avoids the inconvenience of requiring a user to cut down the large tire cover to accommodate smaller tire sizes.

Figure 2:
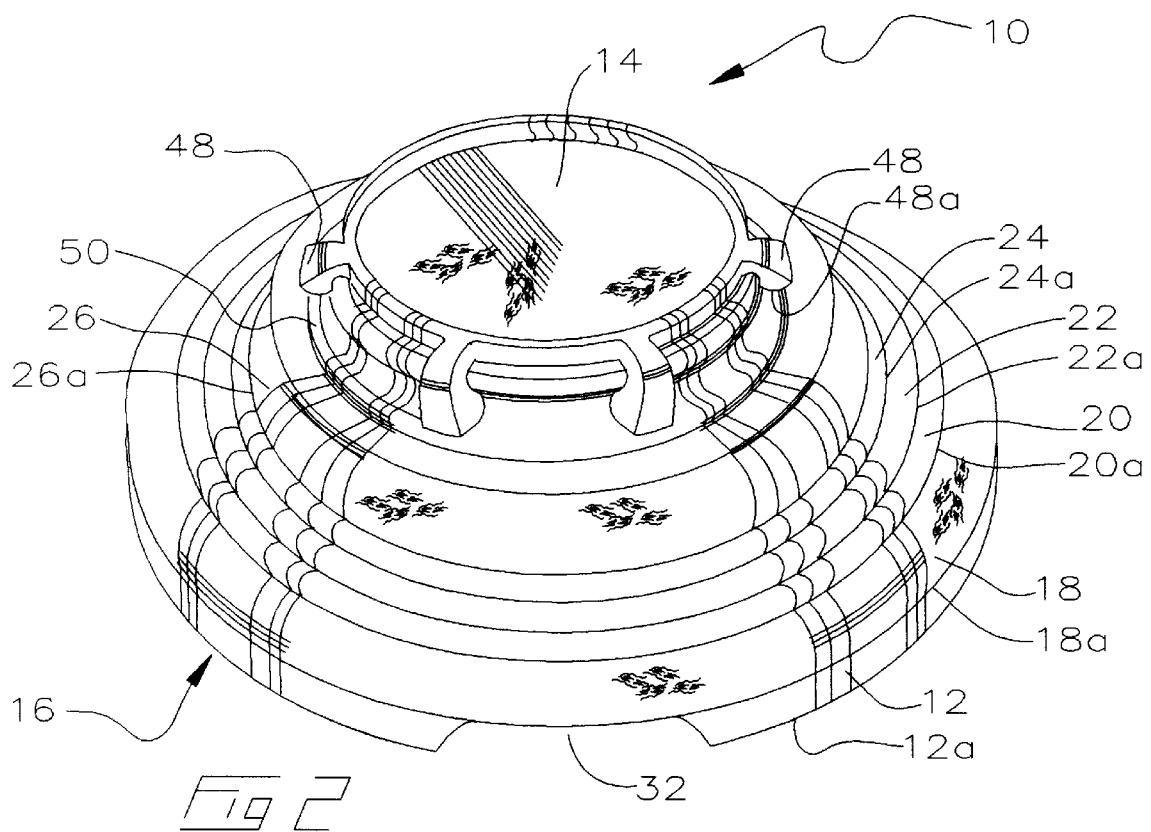
FIG. 2 is a bottom perspective view of the said embodiment.
Figure 3:
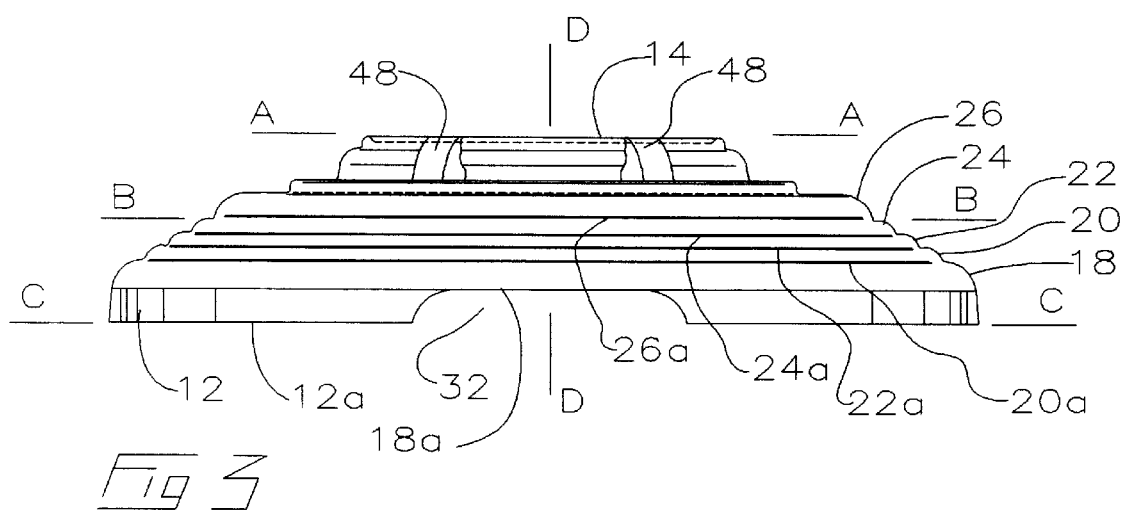
FIG. 3 is a bottom view of the said embodiment.
Figure 4:
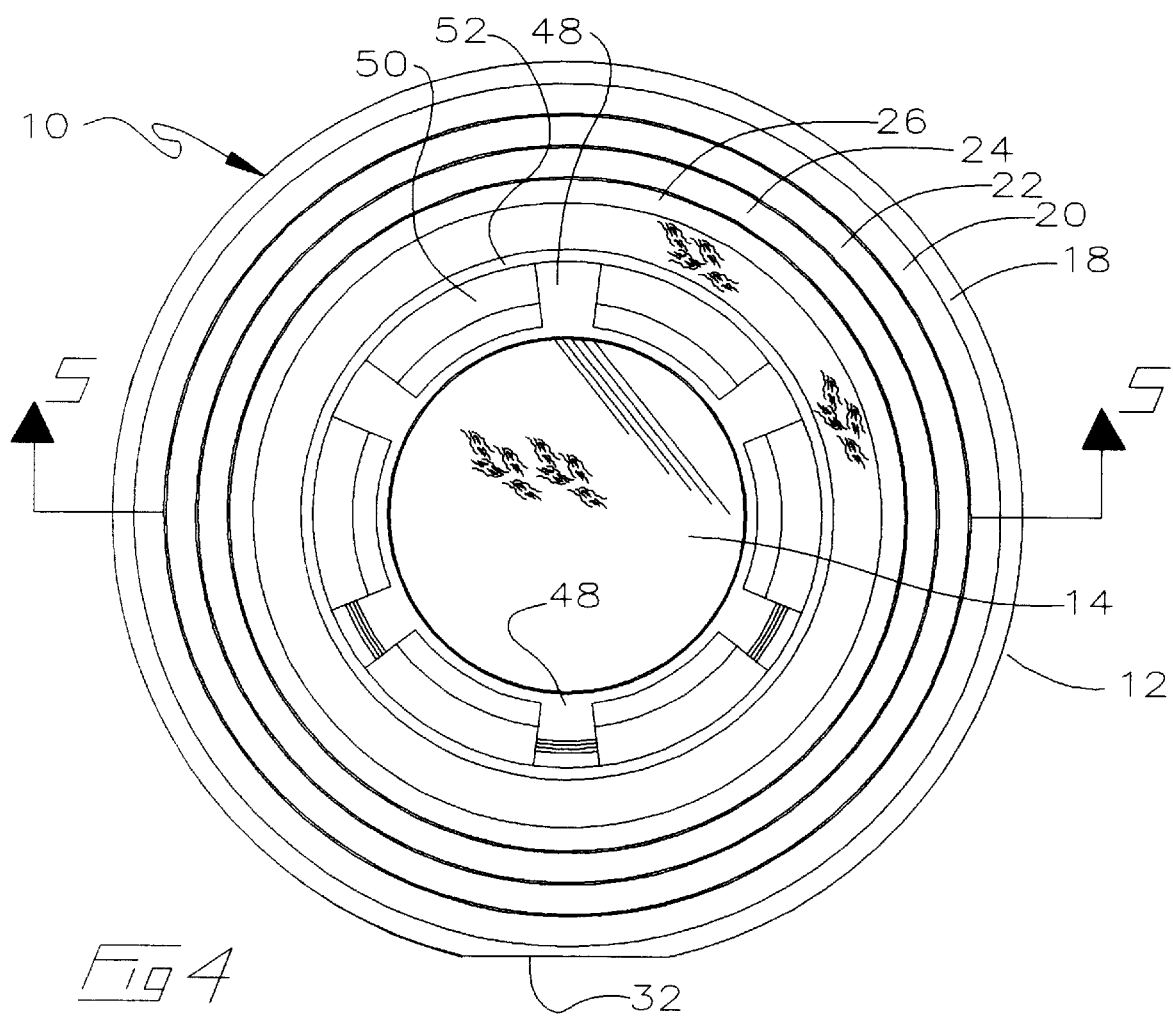
FIG. 4 is a front elevation view of the said embodiment.
Figure 5:
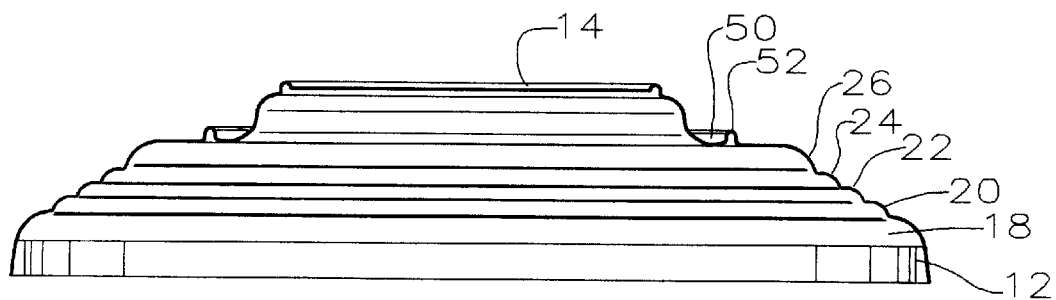
FIG. 5 is a cross section view of the said embodiment along cross section line 5—5 seen in FIG. 4.

As may be seen in FIGS. 1–6, the shape of tire cover 10 may be thought of as a truncated cone that has been flattened so as to produce a partly telescoped or rested concentric ripple effect along the sides of the cone rising from its outermost rim 12 to its truncated vertex 14, A concentrically nested radially adjacent series of concentric annular steps 16 are formed in the generally conical side surface of the tire cover.

In one preferred embodiment the concentric adjacent array of steps 16 are formed in the radially outermost portion of the tire cover and each step corresponds to one of the desired tire sizes in the range of tire sizes that the tire cover is intended to provide for. Thus, a largest diameter first step IS has a perimeter 18a having a 37 inch diameter so as to accommodate 22.85 inch truck tires. The next adjacent step, second step 20, has a perimeter 20a having a 33¾ inch diameter so as to accommodate 19.5 inch tires. The next adjacent step, third step 22, has a perimeter 22a having a 31½ inch diameter to accommodate 16 inch tires. The next adjacent step, fourth step 24, has a perimeter 24a having a 28⅞ inch diameter providing for 15 inch tires. Lastly, the next adjacent step, fifth step 26, has a perimeter 26a having a 27½ inch diameter so as to accommodate 14 inch tires.

As described above, a single mold is used to manufacture a tire cover having one or more of these steps, depending on the desired size of tire to be covered. Thus if the desired tire size to cover is a 19½ inch tire, a single annular insert is placed into the mold prior to formation of the tire cover. The insert displaces the void which would otherwise be filled by polyethylene so that instead of rim 12 being formed at perimeter 18a of first step 18, the outermost rim of the tire cover is formed at perimeter 20a of second step 20. If it is desired to manufacture yet a smaller size tire cover for example so as to cover a 16 inch tire, two concentrically co-operating inserts (not shown), are placed into the mold so as to occupy the void which would otherwise be filled by polyethylene forming steps 18 and 20. The mold so adapted then forms a tire cover wherein the outermost rim is located at perimeter 22a of third step 22. If a tire cover to fit over yet smaller tires is desired then the corresponding number of inserts are placed into the mold, corresponding to the number of steps between first step 18 and fifth step 26 which it is required be removed from the perimeter of the tire cover in order to reduce the diameter of the tire cover to the required size. Of course, the above specifications are not intended to be limiting. In other embodiments contemplated to be within the scope of the present invention, the diameter of the various step perimeters may be different so as to accommodate different size tires, and the tire cover may have a different number of steps in its radially adjacent concentric annular array of steps 16, depending on the number of tire sizes that it is desired to provide for using a single mold.

Truncated vertex may be formed as a planar surface to which may be affixed, or in which may be formed, trademarks, logos, or other textual or graphical material. The surface of truncated vertex 14 lies generally in a plane, labelled for reference plane A. Plane A is generally parallel to the parallel planes containing perimeters 18a, 20a, 22a, 24a, and 26a, the latter labelled for case of reference plane B.

Rim 12 is flared slightly radially outwardly from perimeter 18a so that its radially outermost perimeter 12a fits, for example with a ¼ inch clearance, over tread 28 of a tire 30, for example as illustrated in FIG. 6 in dotted out-line. Perimeter 12a lies in a plane, labelled for reference plane C, which is parallel to planes A and B.

An elongate notch 32 is formed in rim 12 so as to Accommodate a bulge 34 in sidewall 36, again shown in dotted out-line. Bulge 34 results from the weight of the vehicle or trailer being communicated to the tire via axle 38 and the hub 40 or otherwise the rim on which tire 30 is mounted. Thus as the tire is crushed between the hub or rim and the ground surface 42, conventionally then sidewalls 36 in the region adjacent ground surface 42 bulge. Providing notch 32 allows tire cover 10 to be installed without having to elevate the tire or roll the tire so that rim 12 is fitted over the edge of tread 28. Of course, where it is desired to make tire covers having smaller diameters, so that, as described above, the tire cover fits over smaller sized tires, it is understood that the inserts used in the mold form corresponding notches 32 in the outermost perimeter of the tire cover being formed.

Tire cover 10 is held in place over sidewall 36 when mounted onto tire 30 by means of a length of shock cord, light resilient bungee or the like releasably mounted to, so as to stretched between, holes 44 formed in diametrically opposite sides of rim 12. Such elongate resilient fasteners 46 may be releasably fastened to holes 44 by means of knotting, hooks, clips or the like (not shown). Holes 44 are positioned radially spaced from notch 32 for example by 90 degrees on either side of notch 32 so that fastener 46 may be stretched under or over axle 38 as better seen in FIG. 6 so as to tension tire cover 10 against tire 30.

Truncated vertex 14 is elevated relative to rim 12, that is, plane A is spaced from plane C a sufficient distance so that a protruding hub 40 is contained within the cavity defined by tire cover 10 without the need for cutting an aperture in the tire cover to allow the hub to protrude therethrough. A tire cover that must be adapted in this fashion, that is, by cutting or otherwise is formed with an aperture therein, is either inconvenient if it is required that a user cut the aperture or structurally weaken by the aperture itself.

Lugs 48 are formed in a radially inner portion of tire cover 10 adjacent truncated vertex 14. Lugs 48 extend radially outwardly of truncated vertex 14 in equally spaced radially spaced apart array. Lugs 48 are formed integrally with tire cover 10 so that the base 48a of each lug is rigidly mounted into correspondingly shaped annular depression or channel 50 formed on the radially inward side of annular lip 52. Lugs 48 provide structural stiffening so as to more rigidly support truncated vertex 14 spaced apart from steps 16 and rim 12. Advantageously, lugs 48 also provide grips or hand holds which may be grasped by a user when the user is manipulating the tire cover for example when installing the tire cover onto a tire or when removing the tire cover from a tire.

Applicant has found that with the appropriate means of attachment of the ends of fastener 46 into holes 44, in particular the use of open hooks, fastener 46 may be removed, that is at least one end of fastener 46 released from a corresponding hole 44 by a user grasping an oppositely disposed pair of lugs 48, pulling so as to release rim 12 from tire 30, and twisting or otherwise rotating tire cover 10 about its axis of symmetry D. The twisting of tire cover 10 will, with the appropriate choice of shaped hooks on the end of fastener 46, release at least one end of fastener 46 so that tire cover 10 may be easily removed from the tire. Otherwise, the ends of fastener 46 may be simply manually released from within holes 44, although this may entail reaching in to the wheel well.

Because of the large diameter of the largest size of tire cover 10, if the thickness of the tire cover, identified above is being approximately ⅛ inch of polyethylene, becomes too great in order to provide structural rigidity the tire cover becomes heavy and cumbersome to use. In order to keep the tire cover within a manageable weight range, the thickness of the shell has to be kept thin, for example ⅛ inch. This results in the tire cover becoming flexible. If the shell is too thin however the tire cover becomes unusably flexible. It has been found that a useful trade-off is as described above where a thin shell of polyethylene is formed by injection molding and given some rigidity, sufficient for case of manipulation by a user, by employing the stepped structure disclosed and the lugs that assist in supporting the elevated truncated vertex 14. This structure provides that for example, truncated vertex 14 may be sufficiently rigidly maintained spaced apart at least 6½ inches from rim 12 to accommodate significantly protruding hubs or hubcaps. It is desirable to maintain flexibility to some degree in the tire cover however so as to avoid damage to the tire cover should the tire lose air pressure or become flat. Also damage is avoided if a user neglects to remove the tire cover prior to moving the vehicle or trailer.

As will be apparent to those skilled in the art in the light of the foregoing disclosure, many alterations and modifications are possible in the practice of this invention without departing from the spirit or scope thereof. Accordingly, the scope or the invention is to be construed in accordance with the substance defined by the following claims.

What is claimed is:

1. A tire cover comprising:
   a flexible truncated cone having a base rim around a periphery thereof, a truncated top surface, and a generally conical surface extending from said base rim to said top surface, said generally conical surface comprising a radially adjacent array of concentric rings forming a concentrically stepped surface on said generally conical surface, a plurality of rings of said array of concentric rings corresponding in diameter to a corresponding, range of tire sizes,
   said base rim having a notch therein sized to accommodate a bulge, caused in a sidewall of a static tire by weight loading of the tire resting on a ground surface, when said tire cover is mounted over the sidewall of the tire, said top surface spaced from said base rim a sufficient distance so as to accommodate within said tire cover a hub protruding from the tire when said tire cover is mounted over the sidewall.

2. The tire cover of claim 1 wherein said radially adjacent array of concentric rings are formed in said generally conical surface around a radially outer portion of said conical surface, a radially spaced apart array of lugs formed on a radially inner portion of said conical surface, adjacent said top surface so as to protrude therefrom.

3. The tire cover of claim 2 further comprising elongate resilient fastening means for mounting said tire cover to the tire.

4. The tire cover of claim 3 wherein said resilient fastening means is a resilient strap releasably mountable to opposite sides of said tire cover so as to be mountable behind the tire when said tire cover is mounted to the tire.

5. The tire cover of claim 2 wherein said lugs are large so as to provide hand holds for a user manipulating said tire cover.

6. A tire cover comprising:

a flexible truncated cone having a base rim around a periphery thereof, a truncated top surface, and a generally conical surface extending front said base rim to said top surface, said generally conical surface comprising a radially adjacent array of concentric rings forming a concentrically stepped surface on said generally conical surface, a plurality of rings of said array of concentric rings corresponding in diameter to a corresponding range of tire sizes, said base rim having a notch therein sized to accommodate a bulge, caused in a sidewall of a static tire by weight loading of the tire, resting on it ground surface, when said tire cover is mounted over the sidewall of the tire, said top surface spaced from said base rim a sufficient distance so as to accommodate within said tire cover a hub protruding from the tire when said tire cover is mounted over the sidewall, wherein said radially adjacent array of concentric rings are formed in said generally conical surface around a radially outer portion of said conical surface, a radially spaced apart array of lugs formed on a radially inner portion of said conical surface, adjacent said top surface so as to protrude therefrom.

7. The tire cover of claim 6 further comprising elongate resilient fastening means for mounting said tire cover to the tire.

8. The tire cover of claim 7 wherein said resilient fastening means is a resilient strap releasably mountable to opposite sides of said tire cover so as to be mountable behind the tire when said tire cover is mounted to the tire.

9. The tire cover of claim 6 wherein said lugs are large so as to provide hand holds for a user manipulating said tire cover.

* * * * *